United States Patent [19]

Anderson

[11] 4,293,251
[45] Oct. 6, 1981

[54] DEVICE FOR TRANSFERRING FLUID TO A ROTATING UNIT

[75] Inventor: Kjell Anderson, Fagersta, Sweden

[73] Assignee: Seco Tools AB, Fagersta, Sweden

[21] Appl. No.: 143,858

[22] Filed: Apr. 25, 1980

[30] Foreign Application Priority Data

Jun. 12, 1979 [SE] Sweden .............................. 7905152

[51] Int. Cl.³ ...................... B23B 27/10; F16L 27/08
[52] U.S. Cl. .................................... 408/59; 285/190;
407/11; 173/57
[58] Field of Search ........................ 285/190; 175/207;
173/57; 408/56–61; 407/11

[56] References Cited

U.S. PATENT DOCUMENTS 2,230,881 2/1941 Browne ........................... 285/190 X
2,270,927 1/1942 Browne ........................... 285/190 X
2,492,025 1/1970 Holland ........................... 285/190 X

FOREIGN PATENT DOCUMENTS 1449608 9/1976 United Kingdom ............... 285/190

*Primary Examiner*—Dave W. Arola
*Attorney, Agent, or Firm*—Burns, Doane, Swecker & Mathis

[57] ABSTRACT

A device for transferring fluid to a rotating unit (11), for example a cutting tool, having a housing (10) mounted on the rotating unit (11) and comprising an inner ring (21) and an outer ring (22). For purposes of decreasing the demand for close tolerance on fit between the inner ring (21) and the rotating unit (11) a connecting means (26) is adapted to non-rotatably attach the inner ring (21) to the rotating unit (11) and is provided with a through-flow passage (27) which interconnects passages (23, 24, 25) in the inner ring (21) and the outer ring (22) communicating with a fluid source with a passage (19) in the rotating unit (11).

4 Claims, 2 Drawing Figures

DEVICE FOR TRANSFERRING FLUID TO A ROTATING UNIT

BACKGROUND AND SUMMARY OF THE PRESENT INVENTION

This invention relates to a device for transferring fluid, such as cooling or flushing medium, to a rotating unit, such as a cutting tool, for example a drill, comprising a housing arranged on the rotating unit. The housing comprises a first member non-rotatably attached to the rotating unit, and a second member which is rotatable relative to the first member. The first and second members are provided with first passages for connecting a fluid source to a second passage in the rotating unit.

Previously known devices of the above type require that the area on the rotating unit against which the first member rests is completely cylindrical, and that the tolerance on fit between the rotating unit and the first member is kept within close limits. In most cases a press-fitting is required in order to achieve a satisfactory connection.

The object of the present invention is to provide a device for transferring fluid of the above type, which does not require a completely cylindrical mounting area on the rotating unit, and which has very low demands for the tolerance on fit between the members which are non-turnably interconnected.

The above and other objects have been attained by giving the invention the characterizing features stated in the claims following hereinafter.

BRIEF DESCRIPTION OF THE DRAWINGS

The invention is described in detail in the following with reference to the accompanying drawings in which one embodiment is shown by way of example. It is to be understood that this embodiment is only illustrative of the invention and that various modifications thereof may be made within the scope of the claims.

In the drawings

DETAILED DESCRIPTION OF THE PREFERRED EMBODIMENT

Figure 1:
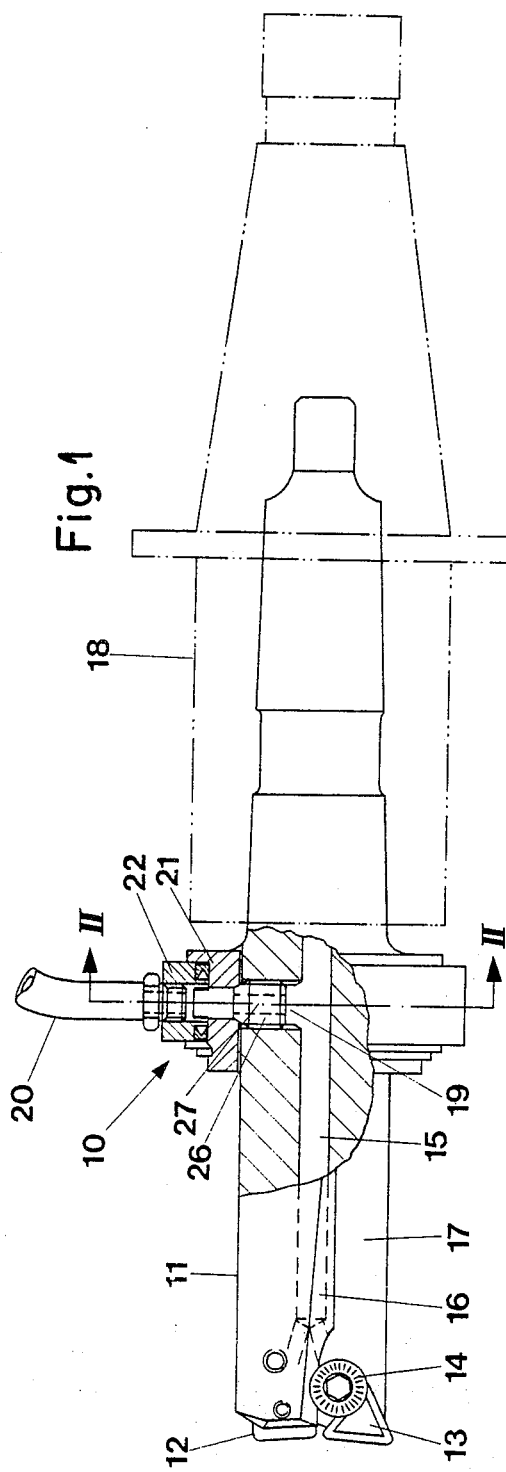
FIG. 1 shows, partly in section, a side view of the invention applied in a short hole drill.

In FIG. 1 a housing or swivel joint generally denoted by 10 is mounted on a short hole drill 11, which in conventional manner is seated in the chuck of a drilling machine 18. The short hole drill 11 is provided with two indexable cemented carbide cutting inserts 12, 13, which overlap radially. The insert 13 has three cutting edges and is secured in cutting position by means of a screw 14. The drill 11 is intended for drilling short holes in metallic bodies, preferably with a depth ranging up to twice the hole diameter. Cutting fluid for flushing the chips and cooling the cutting surface is supplied through an inner passage 15, which has two openings, one at each of the cutting inserts. The chips from a cutting insert 13 are flushed via an outer V-shaped groove, which is formed by radially inwardly directed surfaces 16, 17 on the drill body.

Rearwardly, the passage 15 turns into a transverse passage 19, which is connected to a cutting fluid pump of the drilling machine via the swivel joint 10 and a conduit 20 connected thereto.

The swivel joint 10 comprises an inner ring 21 and an outer ring 22 which is rotatable relative to the inner ring. The conduit 20 is connected to a bore 23 in the outer ring 22. The communication between the conduit 20 and the passage 19 is ensured whatever the mutual relative rotational position is between the rings 21, 22 due to an annular groove 25 in the outer ring 22.

In known manner the outer ring is provided with a sealing ring on each side of the bore 23 for sealingly engagement with the inner ring 21, and is secured relative to the inner ring by means of a lock ring. A radial bore 24 is provided in the inner ring 21.

According to the invention a connecting means in form of a nipple 26 is screwed into the passage 19. The nipple 26 is provided with a transverse bore 27, by means of which the passage 19 is connected to the bore 24.

Figure 2:
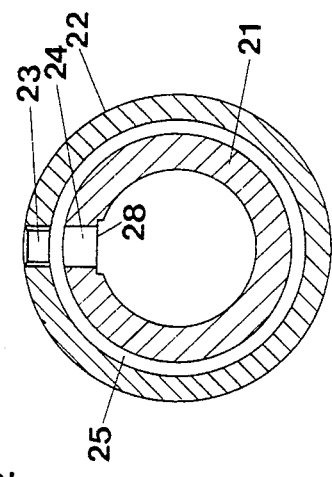
FIG. 2 shows a section taken on the line II—II in FIG. 1.

As shown in FIG. 2, wherein for the sake of clarity the short hole drill 11 and the nipple 26 have been omitted, the portion 28 around the radially inner opening of the bore 24 is enlarged at 28 substantially flat. The radially outer end of the nipple 26 is conical and intended to cooperate with the portion 28, thereby ensuring that a fluid-tight seal is achieved.

When mounting the swivel joint 10 the nipple 26 is first fully screwed into the passage 19; the nipple being provided with an inner socket for a key. The inner ring 21 and the outer ring 22 are mutually turned so that the bores 23, 24 are in alignment, whereupon the swivel joint 10 is pushed over the short hole drill 11 so that its bores 23, 24 coincide with the passage 19. Then the nipple 26 is screwed out of the passage 19 so that its conical outer end is forced against the portion 28.

According to the invention a non-turnable connection between the inner ring 21 and the short hole drill 11 is ensured even if there is a play between these members.

The invention is of course not limited to the embodiment illustrated in the drawings but is generally applicable in connection with transferring of fluid to rotating units. Specifically, in cases where the short hole drill is mounted in a holding device which in its turn is attached to a machine tool, the swivel joint can be mounted on such a holding device.

I claim:

1. A device for transferring fluid such as a cooling or flushing medium from a fluid source to a rotating member, said device including a housing mountable on said rotating member which comprises:
    a first member non-rotatably attachable to said rotating member,
    a second member rotatably mounted on the outside of said first member,
        said first and second members forming first passage means for fluidly connecting the fluid source with a fluid passage in the rotating member,
    connecting means for securing said first member non-rotatably to the rotating member, said connecting means disposed in said first passage means and including a through-flow passage to conduct fluid to the fluid passage in the rotating member, and
    and means retaining said second member rotatably on said first member such that said first and second members are installable as a unit onto said rotating member and securable to the latter by said connecting means.

2. A device according to claim 1, wherein said first member includes a radial bore forming a portion of said first passage means, the radially inner end of said radial bore including an enlargement, said connecting means comprising a nipple projecting into said enlargement and terminating short of the radially outer end of said bore, said outer end of said bore being of smaller diameter than said connecting nipple.

3. A device according to claim 1, wherein said rotating member comprises a cutting tool.

4. A device according to claim 3, wherein said cutting tool comprises a drill.

* * * * *